United States Patent
Cole et al.

(10) Patent No.: US 6,331,080 B1
(45) Date of Patent: Dec. 18, 2001

(54) OPTICAL FIBER CONNECTOR USING COLORED PHOTOCURABLE ADHESIVE

(75) Inventors: Brian M. Cole; William V. Dower, both of Austin, TX (US); Joel D. Oxman, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/169,367

(22) Filed: Oct. 9, 1998

Related U.S. Application Data

(63) Continuation-in-part of application No. 09/116,142, filed on Jul. 15, 1998.

(51) Int. Cl.[7] .................................................. G02B 6/36
(52) U.S. Cl. ............................ 385/80; 385/84; 385/147; 522/95
(58) Field of Search ................................. 385/80; 522/95, 522/96, 103, 107, 97, 106, 35, 42

(56) References Cited

U.S. PATENT DOCUMENTS

| | | | |
|---|---|---|---|
| 3,729,313 | 4/1973 | Smith et al. | 96/27 |
| 3,741,679 | 6/1973 | Smith et al. | 96/35.1 |
| 3,773,706 | 11/1973 | Dunn | 260/37 |
| 3,783,151 | 1/1974 | Carlick et al. | 260/471 |
| 3,808,006 | 4/1974 | Smith et al. | 96/88 |
| 4,026,705 | 5/1977 | Crivello et al. | 96/27 |
| 4,250,053 | 2/1981 | Smith | 252/426 |
| 4,356,050 | 10/1982 | Crivello et al. | 156/273.3 |
| 4,394,403 | 7/1983 | Smith | 427/42 |
| 4,588,256 | 5/1986 | Onstott et al. | 350/96.21 |
| 4,642,126 | 2/1987 | Zador et al. | 51/295 |
| 4,984,865 | 1/1991 | Lee et al. | 350/96.2 |
| 5,024,363 | 6/1991 | Suda et al. | 225/96.005 |
| 5,048,908 | 9/1991 | Blonder et al. | 385/39 |
| 5,048,915 | 9/1991 | Coutts et al. | 385/86 |
| 5,362,812 | 11/1994 | Holmes et al. | 525/274 |
| 5,381,498 | 1/1995 | Bylander | 385/83 |
| 5,381,504 | 1/1995 | Novack et al. | 385/128 |
| 5,425,824 | * 6/1995 | Marwick | 156/64 |
| 5,545,676 | 8/1996 | Palazzotto et al. | 522/15 |
| 5,757,997 | 5/1998 | Birrell et al. | 385/60 |
| 6,085,004 | * 7/2000 | Dower et al. | 385/80 |

FOREIGN PATENT DOCUMENTS

| | | | |
|---|---|---|---|
| 342965 | 11/1989 | (EP) | C08J/3/24 |
| 434212 | 6/1991 | (EP) | G02B/6/38 |
| 609841 A2 | 8/1994 | (EP) | G02B/6/255 |
| 622833 | 11/1994 | (EP) | H01L/12/302 |

OTHER PUBLICATIONS

US Serial No. 08/801,058, Filed Feb. 14, 1997.

* cited by examiner

Primary Examiner—Frank G. Font
Assistant Examiner—Andrew H. Lee
(74) Attorney, Agent, or Firm—Darla P. Fonseca

(57) ABSTRACT

A colored adhesive useful for an optical fiber connection or termination, containing an adhesive component having a viscosity between about 200 centipoise and about 5000 centipoise, a colorant which is soluble in the adhesive component having a first color before exposure to radiation having a wavelength of from about 400 to about 1100 nanometers, and a second color after exposure to radiation, and an initiator system to cure the adhesive composition by exposure to the radiation.

3 Claims, 3 Drawing Sheets

OPTICAL FIBER CONNECTOR USING COLORED PHOTOCURABLE ADHESIVE

This application is a continuation in part of application Ser. No. 09/116,142 filed Jul. 15, 1998.

BACKGROUND OF THE INVENTION

1. Field of the Invention

The invention relates to an adhesive composition for bonding an optical fiber to a suitable housing using light, in the visible and near-infrared ranges of the spectrum, to cure the adhesive. A colorant included in the adhesive composition provides evidence that the space between the optical fiber and the housing is filled prior to curing. The colorant further signals the point at which exposure to a light source is sufficient to cure the adhesive and bond the optical fiber within the housing.

2. Description of the Prior Art

Successful use of optical fiber cables for carrying, e.g. telecommunication signals depends upon maintaining axial alignment of the fiber along the length of the cable even though it may be subject to junctions held together by suitable connector or termination structures. Correct positioning of the optical fiber, within the connector or termination structure, represents a critical requirement for maintaining maximum signal transmission across a junction of precisely aligned fibers. Precise alignment relies upon the retention of a fixed spatial relationship between the fiber and the connector structure. When accurately established, correct spatial relationship ensures desirable fiber-to-fiber alignment during junction formation using interlocking connector or termination structures which may be subject to repeated engagement and disengagement. A convenient means to establish the correct spatial relationship between an optical fiber and a connector involves the use of a bonding material, usually an adhesive, for securing the fiber to an inner surface of the connector structure.

There are many examples of the use of adhesives, of various kinds, for bonding optical fibers inside connector structures. U.S. Pat. No. 4,588,256 discloses the use of hot melt adhesive, contained in an optical fiber mounting means, inside a connector. Upon heating of the optical fiber mounting means, the hot melt adhesive softens, allowing insertion of the optical fiber which becomes bonded to the mounting means when the adhesive cools and solidifies. Similarly, U.S. Pat. Nos. 4,984,865 and 5,048,915 employ thermoplastic adhesives for bonding an optical fiber within a connector structure. In both cases, a small amount of molten adhesive exudes from the tip of the connector under the force of insertion of the optical fiber into the heated thermoplastic adhesive. Upon cooling, a small drop of adhesive surrounds the glass fiber, at the tip of the connector. This drop formation, while suggesting that adhesive surrounds the optical fiber, does not provide confirmation that adhesive fills the connector. Such filling of the connector, to place adhesive in the space between the optical fiber and the inner wall of the connector, provides the optimum condition for securely bonding the fiber to the connector. Less than optimum bonding could lead to disruption in the position of the fiber relative to the connector with resultant loss of alignment between fibers present in connectors used to join lengths of optical cable together.

A means to indicate optimum bonding between optical fibers and connecting structures would be advantageous towards providing reliable optical fiber connections. Suitable indicating means would confirm bond formation capable of surviving forces associated with shock or extension of a connection. The current invention provides a means of indicating optimum bond formation using an colored adhesive composition, which, during bonding of the optical fiber inside a fiber connector structure, shows uniform coloring when the adhesive fills the space between the fiber and the connector in a first color. The adhesive is subject to curing by exposure to visible light, and as it cures, the first color changes to a second color at the initiation of cure.

Further, such adhesive should be of a viscosity small enough such that it is injectable, however, large enough, such that when injected it will remain in the desired area of the connector and not migrate to other areas.

SUMMARY OF THE INVENTION

The invention provides an adhesive which bonds an optical fiber to a fiber housing in an optical fiber connector. The adhesive contains a colorant to show that the space between the optical fiber and the housing is filled prior to curing the adhesive with light of wavelengths found in the visible and near-infrared ranges of the spectrum. As the adhesive cures the colorant further signals the point of sufficient exposure to light to bond the optical fiber within the housing.

More specifically, the invention provides an adhesive distribution and cure indicating composition for an optical fiber connection or termination, comprising: an adhesive having a viscosity from about 200 centipoise to about 5000 centipoise, a colorant, which is soluble in the adhesive to show how the adhesive distributes inside the connection or termination, the colorant having a first color before exposure to radiation of from about 400 to about 100 nanometers, but preferably from about 400 to about 700 nanometers, and a second color after such exposure, and an initiator system to cure the adhesive composition by exposure to such radiation, the composition preferably having a cure onset up to about 60 seconds with formation of the second color, more preferably up to about 30 seconds.

Preferably the adhesive component comprises at least one acrylate monomer. The adhesive is curable by light of wavelengths from about 400 to about 1100 nanometers, preferably from about 400 to about 700 nanometers, more preferably from about 400 to about 600 nanometers, which includes a portion of the blue and green area of the spectrum, most preferably between about 500 and about 600 nanometers. The adhesive composition cures and the colorant changes color in less than about 30 seconds, preferably less than about 25 seconds, most preferably less than about 15 seconds. The adhesive bonds strongly to the optical fiber and housing of the optical fiber connector.

The invention also provides a method for bonding an optical fiber to a connector.

As used herein, these terms have the following meanings.

1. The term "visible light" means electromagnetic radiation having wavelengths between about 400 nm and about 700 nm.

2. The term "near-infrared", abbreviated "nIR", means electromagnetic radiation having wavelengths between about 700 nm and about 1000 nm.

3. The term "holder" generally refers to the portion of an optical connector designed to secure an optical fiber inside the connector or termination.

4. The term "connector" means an article for aligning a first optical fiber with a second optical fiber by establishing contact between fiber ends and thereafter including a holding means to retain fiber end contact and fiber alignment.

5. The terms "connection" and "termination" mean the point at which the end of a first optical fiber is held in contact with the end of a second optical fiber. The terms "connector", "connection", and termination are used interchangeably.

6. The term "(meth)acrylate" includes both the acrylate and the methacrylate.

7. The terms "epoxy" and "epoxide" mean an organic resin having at least one oxirane ring which is polymerizable by ring opening.

8. The term "epoxy acrylate" means a material containing both an epoxide functionality and an acrylate functionality in the same molecule, or a blend containing both acrylte and epoxy functionality in separate molecules.

9. The terms "colorant" and "color component" are synonymous and mean a compound which has a visible color.

As used herein, all parts, percents, and ratios are by weight, unless specifically stated otherwise.

BRIEF DESCRIPTION OF THE DRAWINGS

The invention will best be understood by reference to the accompanying drawings, wherein.

DETAILED DESCRIPTION OF THE INVENTION

Figure 1:
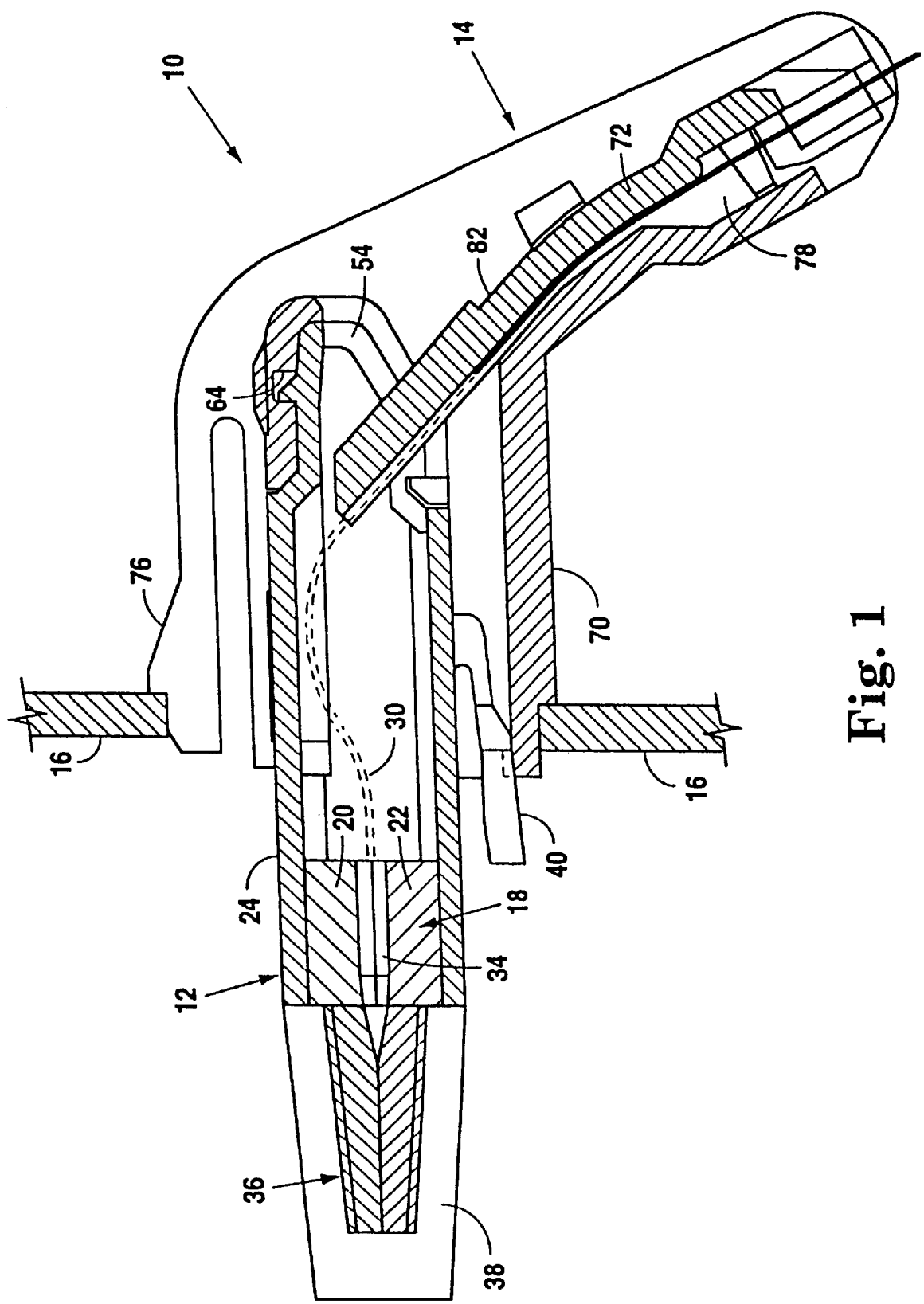
FIG. 1 is a side view of a longitudinal section of one embodiment of the present invention, depicting a fiber optic connector including a plug and receptacle.

Optical fiber assemblies of the invention comprise at least one optical fiber in a holder, adhered to the holder by means of a colored photocurable adhesive, which adhesive changes color when exposed to radiation in the appropriate portion of the spectrum. The color change indicates the onset of cure, i.e., the adhesive has been exposed to sufficient radiation to begin polymerization; the color can be viewed for uniformity to assist in assessing the cure level of the adhesive. The color change should begin within about sixty (60) seconds, preferably within about 30 seconds, more preferably within about 25 seconds, most preferably within about 15 seconds.

Useful adhesives comprise an adhesive component, a free-radical initiator system, and a colorant, which may be separate or may be a portion of the initiator system.

Adhesive components useful in compositions and optical fiber assemblies of the invention have a viscosity of from about 200 to about 5000 centipoise (cps), preferably from about 400 to about 4000 cps, most preferably from about 400 to about 3000 cps.

Adhesive components useful in the system include those formed from at least one epoxy resin, those containing at least one (meth)acrylate monomer, and those formed from at least one epoxy resin and at least one (meth)acrylate monomer.

Useful (meth)acrylate monomers include mono-, di- or poly-(meth)acrylates such as methyl acrylate, methyl methacrylate, ethyl (meth)acrylate, isopropyl (meth) acrylate, allyl (meth)acrylate, glycerol di(meth)acrylate, ethyleneglycol di(meth)acrylate, diethylene di(meth)acrylate, triethyleneglycol di(meth)acrylate, 1,3-propanediol di(meth)acrylte, trimethylolpropane tri(meth)acrylte, petnaerythritol tri(meth)acrylate, 1,4-cyclohexanediol di(meth) acrylate, sorbitol hexacrylate, trihydroxyethyl-isocyanurate tri(meth)acrylate; bis-(meth)acryaltes of polyethylene glycols having molecular weights up to about 500, copolymerizable mixtures of acrylated monomers, e.g., those disclosed in U.S. Pat. 4,642,126, incorporated herein by reference, and the like.

Other free radically polymerizable monomers, i.e., ethylenically unsaturated compounds such as vinyl ethers, diallyl phthalate, styrene, and the like may also be used in adhesive compositions herein.

Useful epoxy materials include linear polymers having terminal epoxy groups, polymers having skeletal oxirane units and polymers having pendent epoxy groups such as glycidyl ether monomers having the formula

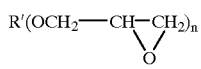

where R' is alkyl or aryl and n is an integer having a value of from 1 to about 6. Examples are glycidyl ethers of polyhydric phenols obtained by reacting a polyhydric phenol with an excess of chlorohydrin. This type of epoxide is disclosed extensively in U.S. Pat. No. 3,018,262, incorporated herein by reference.

Commercially available epoxy resins useful herein include diglycidyl ethyer of Bisphenol A, e.g., those available as "Epon 828", "Epon 8225", Epon 1004", and "Epon 1010" from Shell Chemical Co., and those available as "DER-331", "DER-332", and "DER-334" from Dow Chemical Co.; vinylcyclohexene dioxides including "ERL-4206" from Union Carbide Corp.; 3,4-epoxycyclhexylmethyl-3,4-epoxycyclohexene carboxylates such as "ERL-4221", "Cyracure UVR 6110", or UVR 6105" from Union Carbide Company, 3,4-epoxy-6-methylcyclohexylmethyl-3,4-epoxy-6-methyl-cyclohexen carboxylate such as "ERL-4201" from Union Carbide Corp., silicone resins containing epoxy functionalities, and the like. Also useful are alkyl glycidyl ethers epoxies available under the "HELOXY Modifier" trade name from Shell Chemical Company, bisphenol F epoxides, available as "EPN-111138" or "GY-281" from Ciba Specialty Chemical Corp., and 9,9-bis[4-(2,3-epoxypropoxy)-phenyl]fluoroenone, available as "Epon 1079" from Shell Chemical Company. Polymers of he epoxy resin can contain other functionalities so long as the added functionality does not substantially interfere with cationic cure at room temperature. Blends of epoxy resins are also useful.

Useful polyols to polymerize the epoxy resins include monomeric polyhydroxy materials including alkylene glycols such as 1,2-ethanediol, 1,3-propandiol, 1,4-butanediol, 1,8-octanediol, 2-ethyl-1,6-hexanediol; bis(hydroxymethyl) cyclohexane; polyhydroxyalkanes such as glycerine, trimethylolethane, pentaerythritol, sorbitol, N,N-bis (hydroxyalkyl)benzamide; 1-butyne- 1 ,4-diol, 4,4-bis (hydroxymethyl)diphenylsulfone, castor oil, and the like. Useful polymeric polyols include polyoxyethylene and polyoxypropylene glycols, particularly those having molecular weights from about 200 to about 10,000; polytetramethylene ether glycols such as polytetrahydrofuran or "polyTHF" compounds of varying molecular weight; copolymers of hydroxypropyl and hydroxyethyl (meth) acrylates, copolymers containing pendent hydroxy group formed by hydrolysis or partial hydrolysis of vinyl acetate copolymers, polyvinylacetal resins containing pendent hydroxyl groups; modified celluloses such as hydroxyethylated and hydroxypropylated celluloses; hydroxy-terminated polyesters, polyalkadienes and polylactones, particularly polycaprolactones; fluorinated polyoxyethylene and polyoxypropylene glycols.

Useful commercially available hydroxyl-containing materials include polytetramethylene ether glycols such as "TERATHANE" 650, 1000, 2000 and 2900 (available from du Pont de Nemours, Wilmington, Del.); polyoxyalkylene tetrols having secondary hydroxyl groups such as "PEP" 450, 550 and 650; polyvinylacetal resins such as "BUTVAR" B-72A, B-73, and the like (available from Monsanto Chemical Company, St. Louis, Mo.); resins such as "FORMVAR" 7/70, 12/85, 7/95S, and the like (available from Monsanto Chemical Company); polycaprolactone polyols such as "TONE" 0200, 0210, 0300, and the like (available from Union Carbide); aliphatic polyester diol such as "PARAPLEX U-148" (available from Rohm and Haas, Philadelphia, Pa.); saturated polyester polyols such as the "MULTRON" R series from Mobay Chemical Co.; hydroxypropylated cellulose having an equivalent weight of approximately 100, such as "KLUCEL E" from Hercules Inc.; "Alcohol Soluble Butyrate" cellulose acetate butyrate ester having a hydroxyl equivalent weight of approximately 400 (available from Eastman Kodak Co., Rochester, N.Y.); polyether polyols such as polypropylene glycol diol (e.g., the "ARCOL PPG" series from ARCO Chemical Co.); polypropylene glycol triol such as "ARCOL" LT-28, LHT-42, LHT-112, and the like (available from ARCO Chemical Co.); ethylene oxide capped polyoxypropylene triol or diol such as "ARCOL" 11-27, 11-34, E-35 1, E-452, and the like, from ARCO Chemical Co.; ethoxylated bis-phenol A; propylene oxide or ethylene oxide-based polyols such as "VORANOL" polyether polyols from the Dow Chemical Co.

The adhesive component may also contain both epoxy and free-radically polymerizable functionalities in a single molecule. These may be obtained by reacting a di- or polyepoxide with one or more equivalents of an ethylenically unsaturated carboxylic acid. An example is the reaction product of UVR-6105 with one equivalent of methacrylic acid or acrylic acid. Commercially available materials having epoxy and free-radically polymerizable functionality include the "Cyclomer" series available from Daicel Chemical.

The photoinitiator system is one which is capable of light absorption in the visible range, i.e., between about 400 nm and about 700 nm. In preferred assemblies of the invention, the photoinitiator absorbs light between about 400 nm and about 600 nm, more preferably between 500 nm to about 600 nm, in the green and a portion of the blue portion of the spectrum. Components in the photoinitiator system include at least one initiator and, preferably, at least one sensitizer. These initiator systems initiate polymerization of both the epoxy resin and the free radical monomers when sufficient radiation of suitable wavelengths are absorbed.

Useful sensitizers should be soluble in the monomer and are capable of light absorption in the appropriate wavelengths. The sensitizer is also preferably capable of sensitizing 2-methyl-4,5-bis(trichloromethyl)-s-triazine, according to the test procedure described in U.S. Pat. No. 3,729, 313, incorporated herein by reference. Preferably, the sensitizer is also shelf stable for reasonable periods of time.

Suitable sensitizers are believed to include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones), ketocoumarins, aminoarylketones and p-substituted aminostyryl ketone compounds are preferred sensitizers. For applications requiring high sensitivity, it is preferred to employ a sensitizer containing a julolidinyl moiety. For applications requiring deep cure (e.g., where the coating or strengthening fibers attenuate radiation of similar wavelengths), it is preferred to employ sensitizers having an extinction coefficient below about 1000, more preferably below about 100, at the desired wavelength of irradiation for photopolymerization. Alternatively, sensitizers that exhibit bleaching at the appropriate wavelength(s) may also be used. In this reaction, the sensitizer bleaches the composition, and the initiation may then progress through the layer or layers of material.

By way of example, a preferred class of ketone sensitizers has the formula:

$$ACO(X)_bB$$

where X is CO or $CR^1R^2$, where $R^1$ and $R^2$ can be the same or different, and can be hydrogen, alkyl, alkaryl or aralkyl, b is one or zero, and A and B can be the same or different and can be substituted (having one or more non-interfering substituents) or unsubstituted aryl, alkyl, alkaryl, or aralkyl groups, or together A and B can form a cyclic structure which can be a substituted or unsubstituted cycloaliphatic, aromatic heteroaromatic or fused aromatic ring.

Suitable ketones of the above formula include monoketones (b=0) such as 2,2-, 4,4- or 2,4-dihydroxybenzophenone, di-2-pyridyl ketone, di-2-furanyl ketone, di-2-thiophenyl ketone, benzoin, fluorenones, quinones, e.g., chloroquinone, 2-aza-3-carboxy-9-fluorenone, and the like, chalcone, Michler's ketone, 2-fluoro-9-fluorenone, 2-chlorothioxanthone, acetophenone, benzophenone, 1- or 2-acetonaphthone, 9-acetylantracene, 2-, 3- or 9-acetylphenanthrene, 4-acetylbiphenyl, propiophenone, n-butyrophenone, valerophenone, 2-, 3- or 4-acetylpyridine, 3-acetylcoumarin and the like. Suitable diketones include aralkyldiketones such as anthraquinone, phenanthrenequinone, o-, m- and p-diacetylbenzene, 1,3-, 1,4-, 1,5-, 1,6-, 1,7- and 1,8-diacetylnaphthalene, 1,5-, 1,8- and 9,10-diacetylanthracene, and the like. Suitable α-diketones (b=1 and X=CO) include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-, 3,3'- and 4,4'-dihydroxylbenzil, furil, di-3,3'-indolylethanedione, 2,3-bornanedione (camphorquinone), 1,2-cyclohexanedione, 1,2-naphthaquinone, acenaphthaquinone, and the like.

At least one sensitizer must be present in this photoinitiator system which absorbs visible light. Surprisingly, this colorant 1) identifies the location of the adhesive in the connector; 2) participates in the curing reaction; and 3) undergoes a color change which reflects the onset of curing.

Other preferred sensitizers include Rose Bengal, Methylene Violet, Fluorescein, Eosin Yellow, Eosin Y, Ethyl Eosin, Fosin Bluish, Erythrosin Yellowish Blend, 4',5'-Dibromofluorescein.

The photoinitiator system also typically includes an electron donor, although this is not required. A wide variety of donors can be used; the donor should be soluble in the monomer, and have good shelf stability. Suitable donors are capable of increasing the speed of cure or depth of cure of a composition upon exposure to light of the desired wavelength. The donor has an oxidation potential greater than zero, and less than or equal to the oxidation potential of p-dimethoxybenzene. Preferable the oxidation potential is between about 0.5 and 1 volts vs. A saturated calomel electrode (S.C.E.). Values may be measured experimentally or obtained from references such as N. L. Weinburg, Ed., *Technique of Electroorganic Synthesis Part II Techniques of Chemistry*, Vol. V (1975) and the like.

Preferred donors include amines (including aminoaldehydes and aminosilanes), amides (including phosphoramides), ethers (including thioether), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid, and salts of tetraphenylboronic acid. The donor can be unsubstituted or substituted with one or more non-interfering substituents. Particularly preferred donors contain an electron donor atom such as a nitrogen, oxygen, phosphorus, or sulfur atom, and an abstractable hydrogen atom bonded to a carbon or silicon atom alpha to the electron donor atom.

Preferred amine donor compounds include alkyl-, aryl-, alkaryl- and aralkyl-amines such as methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl- 1,6-hexanediamine, piperazine, 4,4'-trimethylenedipiperidine, 4,4'-ethylenedipiperidine, p-N,N-dimethyl-aminophenethanol and p-N,N-dimethylaminobenzonitrile; aminoaldehydes such as p-N,N-dimethylaminobenzaldehyde, p-N,N-diethylaminobenzaldehyde, 9-julolidine carboxaldehyde and 4-morpholinobenzaldehyde; and aminosilanes such as trimethylsilylmorpholine, trimethylsilylpiperidine, bis (dimethylamino)diphenylsilane, tris(dimethylamino) methylsilane, N,N-diethylaminotrimethylsilane, tris (dimethylamino)phenylsilane, tris(methylsilyl)amine, tris (dimethylsilyl)amine, bis(dimethylsilyl)amine, N,N-bis (dimethylsilyl)aniline, N-phenyl-N-dimethylsilylaniline and N,N-dimethyl-N-dimethylsilylamine. Tertiary aromatic alkylamines, particularly those having at least one electron-withdrawing group on the aromatic ring, have been found to provide especially good shelf stability. Good shelf stability has also been obtained using amines that are solids at room temperature.

Preferred amide donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide and tripiperidinophosphine oxide.

Suitable ether donor compounds include 4,4'-dimethoxybiphenyl, 1,2,4-trimethoxybenzene and 1,2,4,5-tetramethoxybenzene.

Suitable urea donor compounds include N,N'-dimethylurea, N,N-dimethylurea, N',N'-diphenylurea, tetramethylthiourea, tetraethylthiourea, tetra-n-butylthiourea, N,N-di-n-butylthiourea, N,N'-di-n-butylthiourea, N,N-diphenylthiourea and N,N'-diphenyl-N, N'-diethylthiourea.

In one embodiment of the invention, the photoinitiator system is a ternary system, according to U.S. Pat. No. 5,545,676, incorporated herein by reference. In such a three component system, the additional component is a diaryliodonium salt. The iodonium salt should also be soluble in the monomer and be shelf stable when dissolved therein in the presence of the sensitizer and donor. Accordingly an election of a particular iodonium salt may depend to some extent on the monomers selected, and the other portions of the photoinitiator system. Such ternary system must contain these three parts; however, it may contain more than one sensitizer or electron donor, if desired.

Useful salts are those disclosed in U.S. Pat. Nos. 3,729, 313, 3,741,769, 3,808,006, 4,250,053, and 4,394,403, the iodonium salt portions of the disclosures of which are incorporated herein by reference.

Preferred iodonium salts include diphenyliodonium chloride, diphenyliodonium hexafluorophosphate and diphenyliodonium tetrafluorborate.

Adhesives of the invention are prepared by admixing, under "safe light" conditions, the components of the composition. Solvents may be employed if desired; an inert solvent may be used. Examples of suitable solvents include acetone, dichlormethane, and acetonitrile. A monomer to be polymerized may be used as a solvent for another material to be polymerized. Solventless composition may also be prepared with or without the use of mild heating to facilitate dissolution.

If desired, fillers may be added to the extend that they do not interfere with the polymerization process. Useful fillers include silica, pigments, antioxidants, glass materials, and the like.

Figure 2:
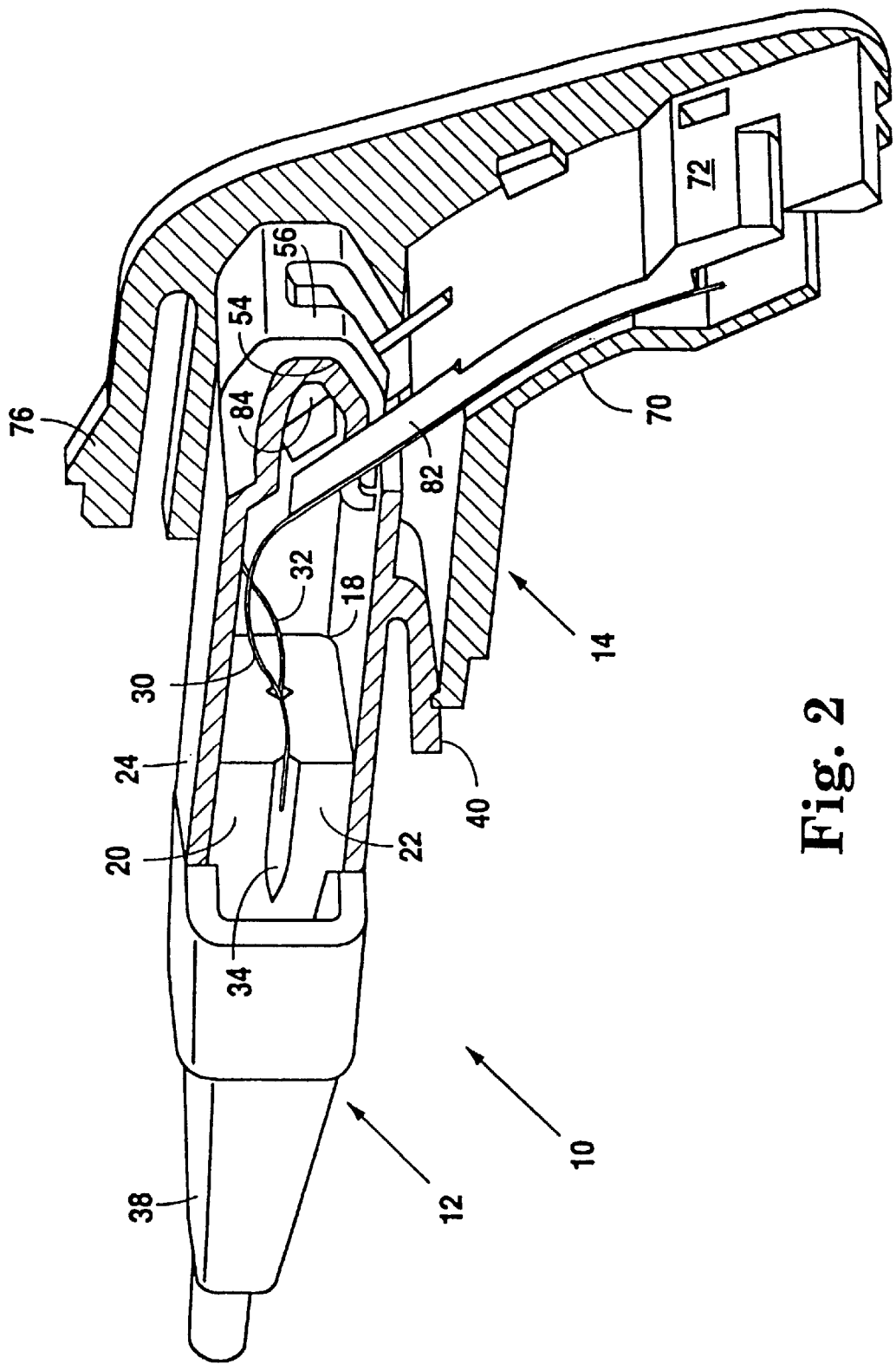
FIG. 2 is a perspective view of the plug and receptacle of FIG. 1, with a partial section revealing the bowed fibers in the plug interior.

The adhesive of the present invention may be used with a variety of different connector designs. FIGS. 1 and 2 illustrate one embodiment 10 of a fiber optic connector in accordance with the present invention. The connector 10 is comprised of an elongate plug 12 and a socket or receptacle 14. FIG. 1 is a longitudinal section of connector 10 showing plug 12 fully inserted in receptacle 14, and receptacle 14 mounted on a support surface or bulkhead 16. FIG. 2 is a perspective view with bulkhead 16 omitted, also with a partial longitudinal section to illustrate the interior of the connector. The depicted embodiment provides for the interconnection of two pairs of fibers, but those skilled in the art will appreciate that the inventive concepts described herein extend to single pair interconnection as well as interconnection of a multiplicity of pairs.

The plug 12 includes a fiber holder 18 which may be constructed of two clamping elements or blocks 20 and 22, and a plug body or shroud 24 which is attached to fiber holder 18. Optical fibers 30 and 32 which are to be interconnected or terminated pass through holder 18 and into the hollow interior of shroud 24. The terminal portions of the fibers are bare, that is, they are not affixed to any alignment member such as a ferrule. The shroud 24 therefore serves not only to assist in physically locating plug 12 in receptacle 14, but also to provide protection for the otherwise exposed terminal portions of the fibers (the shroud could be made retractable to fully expose the fiber tips, if required). The holder 18 has fiber-receiving grooves 34 formed in the adjacent surfaces of blocks 20 and 22; these two components may be identical parts.

The optical fibers are secured to holder 18 by use of the adhesive heretofore described. The adhesive is injected through holes in the connector for that purpose, and cured. The adhesive should adhere to the cable coating, which is typically epoxy silicone, polyolefin or polyvinylchloride, where such is still present as well as the strengthening fibers, e.g., Kevlar®, in those areas where the outer coating has been stripped away, and finally to the fiber itself to hold the fiber in position.

The holder 18 may have an extension 36 surrounding the fibers for additional strain relief and clamping. A boot 38 may be provided for further strain relief and capturing of the strengthening fibers in the fiber cable (KEVLAR® strands), and to assist in handling plug 12. The strengthening fibers need not be crimped, but they may be adhered into the unified structure of the holder by means of the same adhesive as used to secure the fiber to the holder, as described supra. Strain relief of the strengthening members is attained by a force fit of straightwall section of the optical fiber holder within the boot 38. This is dependent upon the choice of materials used for the boot 38 and the optical fiber holder 18, and yields a design that does not require a crimp ring and which assists in ease of manufacture and reduces the number of needed components. "One-way" barbs on the surface of the optical fiber holder assist in the attachment of the boot 38 to the optical fiber holder 18, which also assists in the attachment of the cable to the plug 12.

A latch 40 is integrally molded onto one side of shroud 24 to releasably secure plug 12 to receptacle 14. The latch 40 may also impart mechanical polarization to the plug, that is, it may be inserted into receptacle 14 only in one orientation. Plug 12 may be biased in the interconnected position, e.g., by a springboard (a flexible cantilever) formed inside receptacle 14, to be pushed back against latch 40 to minimize the effect of manufacturing tolerances.

The receptacle 14 includes a body or housing 70 and another fiber holder 72. The housing 70 may also have appropriate features (such as latch arms 76) allowing it to be releasably mounted to bulkhead 16 which may be, for example, a patch panel or workstation outlet (wall box faceplate). The latch mechanism may provide for mounting from the front of the panel, to allow all preparatory work to be done at the front side of the panel, or may provide for mounting from the rear of the panel, to allow all preparatory work to be done at the back side of the panel. Additional mechanisms may be provided, such as the fiber hold-down, to retain the fibers firmly in the grooves. The fibers do not extend to the very tips of fingers 82 and 84 but rather terminate a sufficient distance from the tips to allow proper support of the portion of the optical fibers in the plug when the connector is in use. If the fiber-to-fiber contact occurs very near the tips of the V-grooves (or if the plug is inserted too far), the fiber portion in the plug can bend beyond the groove and lifted away from the apex, breaking the connection.

The receptacle 14 may have as many of these fingers with fiber-alignment grooves as there are fibers in plug 12. Fingers 82 and 84 are shaped to project into slots 54 and 56, respectively, of shroud 24 when plug 12 is fully inserted into receptacle 14. Fingers 82 and 84 enter shroud 24 at an oblique (nonzero) angle with respect the plug axis, i.e., the axis defined by either of the optical fibers 30 or 32 when they are extending straight within shroud 24. This angle is preferably about 42°, which balances concerns regarding fiber end face contact pressure, fiber forces directed into the V-groove, the effects of friction, and the desired tolerance window (a larger angle increases tolerances). Since the receptacle fibers are not directed toward opening 74, there is no danger of escaping light injuring a user's eyes. Receptacle fiber holder 72 is pivotally attached to housing 70 by providing posts on the first end of holder 72 which snap into cutouts or hooks 88 formed at one end of receptacle housing 70. The holder 72 releasably locks into place using bumps or studs formed on the side of the holder, which engage holes 89 in receptacle housing 70. An alternative design for the receptacle fiber holder may be used in which the holder is molded as a single piece with a breakaway top or cover plate that can snap onto its base, the base having the fiber-positioning grooves.

All of the components of connector 10 (except plug boot 38) may be formed of any durable light transmitting material, preferably an injection moldable polymer such as polycarbonate, VALOX (a polyester sold by General Electric), or RADEL (a polyarylsulfone sold by Amoco). The material may include conductive fillers to render the components semiconductive in order to minimize triboelectric charging which can induce fiber end contamination, so long as such fillers do not unduly attenuate the radiation during curing. The boot 38 is preferably formed of low modulus copolyester elastomer, such as that available from RTP of Winona, Minn., under material number 1559X67420B.

Assembly and installation of connector 10 is straightforward. Plug 12 is typically assembled in the factory, although it may easily be assembled in the field. To place the adhesive into the assembly, simply place adhesive into a syringe like applicator (if desirable, the adhesive may be provided in such an applicator), over the opening in the holder and inject the adhesive into the holder 18. The adhesive is then cured by placing a light having the required wavelength radiation above the connector for a period of 5 seconds to a few minutes. Useful lights include the Model XL3000, available from 3M, which uses a 75 Watt tungsten source, either unfiltered or filtered to match the sensitivity of the specific initiator system used.

It is also understood that plug 12 or receptacle 14 could be mounted on a jumper cable or patch cord with any kind of optical connector at the other end of the fibers. It is recommended that fibers be used which have a longer life when exposed to indoor enviromnents, such as the high-strength fibers available from Minnesota Mining and Manufacturing Co. Those fibers have a conventional core and cladding which is surrounded by a novel three-layer construction, as discussed in U.S. Pat. No. 5,381,504, disclosed herein by reference. Those skilled in the art will also appreciate that the connector of the present invention can accommodate discrete optical fibers or multifiber ribbons, as well as both single-mode and multi-mode fibers.

Fibers which are to be pre-terminated to either plug 12 or receptacle 14 should be stripped, cleaved and cleaned. If the fibers are in the form of a ribbon which is part of a bundled group of ribbons in a cable, then a portion of the cable jacket must first be cut back to reveal the ribbons. Most cables have several protective layers, and each of these layers must be removed to provide access to the fiber ribbons. Similar steps must be taken to remove the protective layers of a cable having a single discrete fiber. After the fibers have been removed from the protective cable jacket, they are stripped. The stripped fibers are then ready for cleaving which may be accomplished using any one of several commercially available fiber cleavers, such as that shown in U.S. Pat. No. 5,024,363. The cleave length for attachment of the fibers to plug 12 is the distance from fiber holder 18 which, in the preferred embodiment, is about 23 mm. For attachment of fibers to receptacle 14, the cleave length is the distance from fiber holder 72 which, in the preferred embodiment, is about 15 mm.

Once the craftsperson is satisfied that each of the fibers has an acceptable end face, the fibers may be removed from the cleaver. The fibers may further optionally be provided with an asymmetric treatment, like cleaving so as to impart an angled end face, as taught in U.S. Pat. No. 5,048,908. For the plug, fiber preparation may be done after the fiber cable has been threaded through boot 38.

Final assembly of plug 12 comprises the simple steps of placing the fibers in the V-grooves of holder 18 and snapping shroud 24 onto holder 18. An assembly fixture may be used to guide shroud 24 onto the fiber holder so as to avoid damaging the fibers as they are inserted into the shroud. The ends of the fibers should terminate in the plug about 0.5 mm from the end of the shroud. Completion of receptacle 14 is also simple. Fiber holder 72 is attached to housing 70, first by pushing the pivot posts into cutouts 88, and then snapping the studs into holes 89. Care should be taken during placement of the fibers in the V-grooves and attachment of the holder to the receptacle to not contaminate the fiber tips.

Installation of connector 10 is equally straightforward. Receptacle 14 is optionally mounted to any desired surface by convenient means, such as latching arms 76 (other constructions could be molded into housing 70 for custom mounting). Several receptacles could also be mounted in a single module, and they can be designed for front or rear loading, or sliding from the side. After receptacle 14 is mounted, the connection is completed by simply inserting plug 12 into opening 74. Plug 12 is released from receptacle 14 by latch 40.

The dimensions of the various components of connector 10 may vary considerably depending upon the desired application. The following approximate dimensions are considered exemplary. Plug 12 has an overall length of 57 mm, a width of 12 mm, and a thickness of 8 mm, and fiber holder 18 provides clamping grooves that are 13 mm long. Plug shroud 24 extends 25 mm beyond holder 18, providing an interior space which is 24 mm long, 10 mm wide and 6 mm high. Opening 74 of receptacle 14 is 12 mm×10 mm. Its overall height and depth are 38 mm and 36 mm. Receptacle fiber holder 72 is 20 mm long (from the end where the fibers are clamped to the tips of fingers 82 and 84), 12 mm wide and 1.5 mm thick. The fiber-alignment grooves in fingers 82 and 84 are 11.5 mm long and have a maximum depth of 2 mm which suitably accommodates most conventional optical fibers. The interior angle of the V-grooves should not be too narrow since this might result in excess friction with the fibers, but it also should not be too wide since this would not keep the fibers guided properly. A 90° interior angle is believed to be a good compromise.

Figure 3:
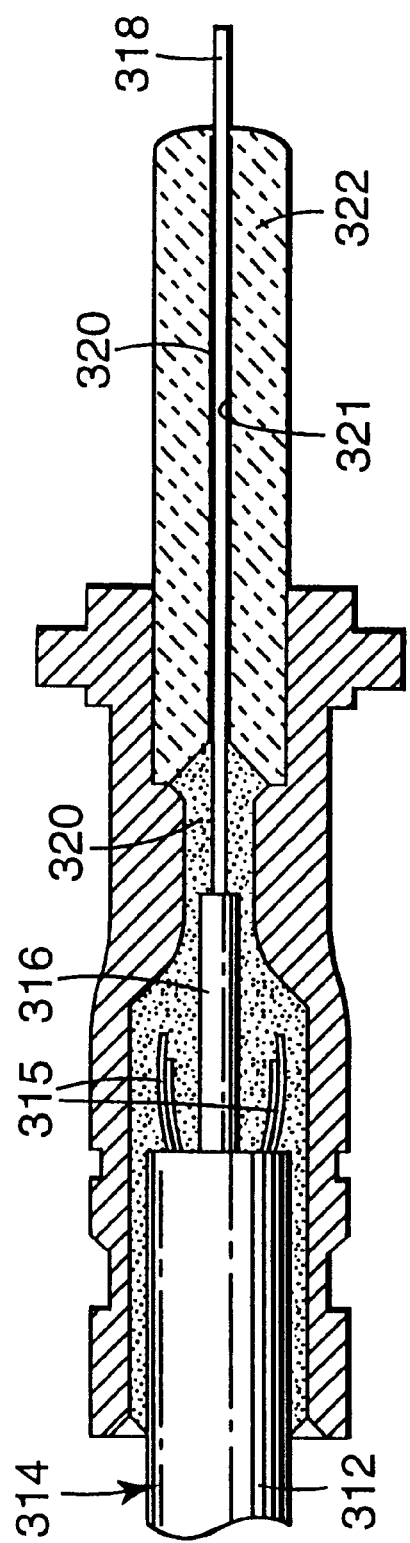
FIG. 3 is a cross section of an alternative connector.

In an alternate connector shown in FIG. 3, the jacket 312 is removed at one end of the optical fiber cable 314, along with the and the fiber coating 318 to expose the strengthening fiber 315 and the optical fiber 318. The adhesive 320 of the invention is injected into the hollow interior of the connector and fills a bore 321 in a ceramic ferrule 322.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. Variations are possible in the plug, receptacle and holder. For detailed discussion of the mechanical construction of a useful connector, see U.S. Pat. Nos. 5,381,498 and 5,757,997, and copending U.S. Ser. No. 08/801,058, all of which are incorporated herein by reference. For example, although only two fiber pairs are shown connected in the figures, connector 10 could accommodate practically any number of fibers (or just a single pair). It is therefore contemplated that such modifications can be made without departing from the spirit or scope of the present invention as defined in the appended claims.

| Glossary | |
| --- | --- |
| Bis GMA | Reaction product of Bis Phenol A diglycidyl ether and 2 equivalents of methacrylic acid. |
| CD 1012 | Diaryliodonium salt. Also known as Sarcat, available from Sartomer |
| CPQ | Camphorquinone |
| DPIPF | Diphenyliodonium hexafluorophosphate |
| EDMAB | Ethyl-p-dimethylaminobenzoate |
| pTHF 250 | Polytetrahydrofuran |
| TEGDMA | Triethyleneglycol dimethacrylate |
| UVR 6105 | 3,4-epoxycyclohexylmethyl-3,4-epoxycyclohexene carboxylate |

Test Methods

Kevlar® Pull Test

Cables were inserted into the plug of FIG. 1 with no Kevlar® fanout. The jacket was placed about 0.010 cm behind the rear injection ports. The adhesive was injected by hand using a 3 cc syringe, being sure that the cavity was completely filled.

Each plug was then cured with two 5 second exposures, one on the top and one on the bottom with the appropriate light sources.

Each duplex cable was cut in half and split until two independent cables protruded from the plug. For the Kevlar® pulls, the plug was placed into a fixture that was attached to a chattillon DFM100 scale. One at a time, the cables consisting of jacket, Kevlar®, and GGP fiber, were wrapped around a 6.25 cm diameter mandrel and clamped into place. They were pulled at a rate of 1.25 cm per minute until failure.

Fiber Pull Test

For fiber pulls, after the plug was placed into the fixture as described for the Kevlar® pull test, the jacket was striped off about four inches from the plug, exposing the Keviar® and GGP fiber. The GGP fiber was wrapped around the 6.25 cm mandrel and clamped in place. They were pulled at a rate of 1.25 cm per minute until failure.

The Kevlar® was wrapped around the 6.25 cm mandrel and pulled at a rate of 1.25 cm per minute until failure.

EXAMPLES

Examples 1–2, and Comparative Examples 1C and 2C

Samples of optical fiber assemblies were made by stripping the outer jacket of the cable, trimming the Kevlar® fibers and inserting the optical fiber into a dual termination connector.

Before bonding the fibers were cleaned with a lint free pad which had been wetted with isopropyl alcohol, then the fibers were inserted into the fitting. Two drops of an adhesive having a formulation listed in Table 1 were then injected into each fiber's channel in the dual termination fixture, and the connector was bonded by exposing it for 25 seconds to a 3M Model XL 3000 curing light having a 75 watt tungsten source from which the blue filter had been removed.

Comparison of the results in Table 1 shows that adhesives without a visible light sensitizer and an indicator dye fail to cure when exposed to visible light. Also, the initiator systems in these examples have been optimized for visible light, and that as a result, they do not cure efficiently as a result of comparable exposure to UV radiation. However, when exposed to visible light, the curing proceeds and the accompanying change in dye color from the initial color to the final color shows the curing process. Further, compositions of the invention exhibit increased pull-out force, as shown in Table 2.

Identical samples of both the inventive adhesives and the comparative adhesives were also exposed to ultraviolet light did not cure.

The pull force needed to remove the fiber from the connector is also shown in Table 1.

TABLE 1

| | (pph) | | | |
|---|---|---|---|---|
| | Example 1 | Example 1C | Example 2 | Example 2C |
| Diacel A-200 | 100 | 100 | | |
| UVR 6105 | | | 100 | 100 |
| p THF 250 | 5.26 | 5.26 | 21.28 | 25.00 |
| CD 1012 | 2.10 | 1.60 | 1.60 | 1.90 |
| EDMAB | 0.10 | 0.10 | 0.106 | 0.125 |
| CPQ | 0.74 | | 0.53 | |
| Rose Bengal | 0.05 | | 0.05 | |
| Avg. Fiber Pull-out force - (Std.Dev.) Newtons | 5.25 (0.79) | | 13.73 (1.61) | |
| Avg. Kevlar Pull-out force - (Std.Dev.) Newtons - visible | 289.8 (71) | No cure | 381.7 (44.8) | No cure |
| Avg. Kevlar Pull-out force - (Std.Dev.) Newtons - UV | No cure | No cure | No cure | No cure |

Examples 3–8; Adhesive Compositions Using Alternative Dyes

Formulations identical except for the dye selection were mixed to form an adhesive; the various compositions appear in Table 2. The optical fiber assembly is formed as described in Examples 1–2, and Kevlar™ pull tests were conducted. The results of the tests are also shown in Table 2.

Table 3 shows the color changes in the various examples.

TABLE 2

| | Ex. 3 | Ex. 4 | Ex. 5 | Ex. 6 | Ex. 7 | Ex. 8 |
|---|---|---|---|---|---|---|
| Bis GMA | 50 | 50 | 50 | 50 | 50 | 50 |
| TEGDMA | 50 | 50 | 50 | 50 | 50 | 50 |
| EDMAB | 1.03 | 1.03 | 1.03 | 1.03 | 1.03 | 1.03 |
| CPQ | 0.17 | 0.17 | 0.17 | 0.17 | 0.17 | 0.17 |
| Tinuvin | 1.03 | 1.03 | 1.03 | 1.03 | 1.03 | 1.03 |
| DPIPF | 0.62 | 0.62 | 0.62 | 0.62 | 0.62 | 0.62 |
| Methylene Blue | 0.10 | | | | | |
| Erythrosin B | | 0.10 | | | | |
| Methylene Violet | | | 0.10 | | | |
| 4,5-Dibromo Fluorescein | | | | 0.10 | | |
| Eosin Y | | | | | 0.10 | |
| Acridine Orange | | | | | | 0.10 |
| Avg. Kevlar Pull-out force - (Std.Dev.) Newtons | 172 (41) | 187 (67) | 100 (48) | 192 (44) | 184 (51) | 227 (57) |

TABLE 3

| Dye Color Change | |
|---|---|
| Rose Bengal | Pink to colorless |
| Methylene Blue | Light blue to slight blue tint |
| Erythrosin B | Pink to orange |
| Methylene Violet | Violet to light blue/colorless |
| 4,5-Dibromo Fluorescein | Pink to yellow |
| Eosin Y | Hot pink to orange |
| Acridine Orange | Yellow to orange |

What is claimed is:

1. A fiber optic connector comprising:
   a) at least one fiber optic cable comprising at least one optical fiber surrounded by a plurality of strengthening fibers, both of which are surrounded by at least one polymeric coating layer, a portion of said cable being stripped in a layerwise manner such that a terminal end of exposed fiber is succeeded by an area of exposed strengthening fibers, succeeded by an area of coated cable;
   b) a holder for said optical cable, and
   c) a colored adhesive injected into said holder, said adhesive comprising
      i) an adhesive component having a viscosity betwveen about 200 centipoise and about 5000 centipoise,
      ii) a colorant which is soluble in the adhesive component, said colorant having a first color before exposure to radiation having a wavelength of from about 400 to about 1100 nanometers, and a second color after exposure to said radiation, and
      iii) an initiator system to cure the adhesive composition by exposure to said radiation,
   said optical fiber, said strengthening fibers and said holder being by means of exposure to said radiation wherein said cure onset occurs within sixty seconds.

2. A fiber optic connector according to claim 1 comprising a plurality of fiber optic cables.

3. A fiber optic connector according to claim 1 wherein said optical cable is a multifiber ribbon.

* * * * *